United States Patent [19]

Spensley et al.

[11] 4,455,171

[45] Jun. 19, 1984

[54] REACTIVATABLE SET-INHIBITED CEMENTITIOUS COMPOSITIONS

[75] Inventors: Robert H. Spensley, Swanwick; John Ellis, Ashfield, both of England

[73] Assignee: Societe Anonyme d'Explosifs et de Produits Chimiques, Paris, France

[21] Appl. No.: 447,392

[22] Filed: Dec. 6, 1982

[30] Foreign Application Priority Data

Dec. 9, 1981 [GB] United Kingdom ............... 8137139

[51] Int. Cl.$^3$ ........................... C04B 7/32; C04B 7/35
[52] U.S. Cl. ................................ 106/104; 106/315
[58] Field of Search .............................. 106/104, 315

[56] References Cited

U.S. PATENT DOCUMENTS

| | | | |
|---|---|---|---|
| 3,053,673 | 9/1962 | Walker | 106/315 |
| 4,131,578 | 12/1978 | Crinkelmeyer et al. | 106/104 |
| 4,352,693 | 10/1982 | Langdon | 106/104 |

FOREIGN PATENT DOCUMENTS

| | | | |
|---|---|---|---|
| 1538102 | 1/1979 | United Kingdom | 106/111 |
| 2003851 | 3/1979 | United Kingdom | 106/90 |

*Primary Examiner*—James Poer
*Attorney, Agent, or Firm*—Wood, Dalton, Phillips, Mason & Rowe

[57] ABSTRACT

Aqueous grouting compositions based on high alumina cement have the onset of setting delayed for upwards of one month by the incorporation therein of a set-inhibiting agent such as boric acid or gluconic acid delta lactone and can then be rapidly reactivated for use by the incorporation therein of a reactivator, for example lithium carbonate, to produce a high strength hardened cementitious composition. The reactivated composition can advantageously be used to anchor a reinforcing element such as a rockbolt or dowel in a borehole and for this purpose the set-inhibited cementitious composition and the reactivator can be packaged in the separate compartments respectively of a dual-compartment frangible cartridge.

9 Claims, No Drawings

REACTIVATABLE SET-INHIBITED CEMENTITIOUS COMPOSITIONS

This invention relates to a set-inhibited and reactivated cementitious grouting composition suitable for use in the anchoring of a reinforcing member, such as a rockbolt or dowel, in a borehole in a rock formation, for example an underground mine roof or for use in the consolidation of porous substrata. The grouting composition may also be of use for other purposes, for example, the repair of damaged concrete, grouting under plates and between pre-cast concrete segments, anchoring small fixings, and flooring applications. It may also be of use as a pumpable cementitious grout, or mortar, or concrete in the mining, tunnelling and construction industries.

In British Patent Specification No. 1,538,102 there is described a method of inhibiting the setting of an aqueous grouting composition based on calcium sulphate hemihydrate ($CaSO_4.1/2H_2O$) plaster when used in the anchoring of a reinforcing element in a borehole in a rock mass, wherein there is incorporated into the grouting composition a set-inhibiting agent which is a polymer or copolymer of acrylic acid (or a water-soluble salt thereof) having a molecular weight in the range from 2000 to 75,000. When required for use there is incorporated into the set-inhibited composition a set-promoter which neutralises the set-preventing effect of the set-inhibiting agent, the promoter being a water-soluble iron, copper or aluminium salt, thereby inducing the setting of the calcium sulphate hemihydrate plaster.

Hydraulic cements other than calcium sulphate hemihydrate plaster, for example Ordinary Portland cement, are also conventionally used in the anchoring of reinforcing members in boreholes drilled in underground rock masses such as mine roofs, as described, for example, in published British Patent Application No. 2003851A. However we have found that the set-inhibiting and set-promoting system described in the above-mentioned British specification does not give analogous results either with Ordinary Portland cement based grouting composition or with high alumina cement based grouting compositions.

We have however surprisingly found that aqueous high alumina cement grouting compositions can have the onset of setting delayed for upwards of several months by the incorporation therein of relatively low levels of a set-inhibiting agent such as boric acid or gluconic acid delta lactone and that such set-inhibited high alumina cement grouting compositions, when required for use, can be caused to set rapidly to a high strength hardened cementitious composition by the incorporation therein, as a reactivator, of compounds known to act as hardening accelerators for non-inhibited high alumina cement compositions, whereas in contrast aqueous Ordinary Portland cement compositions can only be set-inhibited for short periods of up to ten days with relatively high levels of boric acid and such set-inhibited Ordinary Portland cement compositions can not be reactivated to give rapid setting high strength cementitious compositions by the incorporation therein either of known hardening accelerators for non-inhibited Ordinary Portland cement compositions or of the reactivators which have been found to be useful with the set-inhibited high alumina cement compositions.

Hydration of high alumina cement produces principally calcium aluminate hydrates, but it is known that hydration of mixtures of high alumina cement with co-reactive salts produces calcium aluminate complex salt hydrates, e.g. with calcium sulphate, calcium sulphoaluminate hydrates are formed and with calcium chloride, calcium chloroaluminate hydrates are formed. Surprisingly we have found that the set inhibitors useful in this invention act also to delay substantially the onset of setting of reactive blends of high alumina cement and sparingly soluble co-reactant salts, e.g. calcium sulphate or calcium carbonate. The onset of setting of mixtures of high alumina cement with soluble co-reactants, e.g. calcium chloride, is not, however, significantly delayed by the set inhibitors of this invention.

Thus in its broadest aspect the invention provides a method of producing a hardened high alumina cement grouting composition which comprises forming a set-inhibited aqueous high alumina cement grouting composition essentially comprising high alumina cement, water and a set-inhibiting agent (as hereinafter specified) and thereafter, when the grouting composition is required for use, incorporating in said set-inhibited aqueous high alumina cement grouting composition a reactivator composition comprising a reactivator which will cause the grouting composition to set to a high strength hardened cementitious composition.

The reactivated set-inhibited grouting composition of the invention can be employed in the anchoring of reinforcing members, for example rockbolts or wooden dowels, in boreholes drilled in a rock formation, by locating around the reinforcing member the set-inhibited grouting composition and the reactivator composition either separately (with subsequent mixing within the borehole) or in a premixed form. Advantageously the set-inhibited grouting composition and the reactivator composition are provided as separate components contained in a dual-compartment frangible cartridge, the casing of which is preferably formed from a water-impermeable plastics film. The grouting composition of the invention can also be used for the consolidation of porous rock strata by injection thereof into cracks or boreholes.

For maximum extension of set delay as required for use in rockbolting cartridges, the set-inhibiting agent employed in accordance with the invention will generally be boric acid, or gluconic acid delta lactone, either alone or in admixture with salt derivatives thereof such as alkali metal borates or gluconates or alkaline earth metal gluconates, since this has been found consistently to delay the setting of aqueous high alumina cement compositions for periods in excess of one month. The set-inhibiting agent will generally be used in an amount of from 0.01–5% by weight, preferably 0.5–2.5% by weight, based on the weight of high alumina cement.

The high alumina cement employed in the grouting composition of the invention may be any of those which are commercially available, for example the high alumina cement known as Ciment Fondu ("Ciment Fondu" is a registered Trade Mark of Lafarge Aluminous Cement Company Limited). The amount of set-inhibiting agent required will in practice depend on the actual composition of the commercial grade of high alumina cement used. If desired part of the high alumina cement may be present as granular high alumina cement clinker and/or slag containing ferrite or alumino ferrite.

The water which forms part of the grouting composition of the invention may be present in a total amount of from 13 to 200% by weight, based on the weight of high alumina cement. If another liquid is present, the amount of water may be less than 13% by weight. From the foregoing, it will be appreciated that the set-inhibited aqueous grouting composition may be varied in consistency from that of a stiff putty to that of a very fluid slurry, depending upon the use to which it is to be put. In general, relatively stiff putty or paste like compositions, for example, compositions suitable for use in rock-bolting cartridges, will contain from 13–45%, preferably 20–30%, by weight of water, whereas pumpable compositions suitable for use as grouting compositions will contain from 25–200%, preferably 30–90%, by weight of water. Water contents are in all cases based on the weight of high alumina cement but additional filler present in the composition will require correspondingly higher levels of water.

The reactivator employed in accordance with the invention may be selected from substances in the following groups and if desired mixtures of two or more reactivators may be used:

1. lithium (or sodium or potassium) hydroxide, carbonate, sesquicarbonate, aluminate, sulphate, bisulphate, silicate or zincate;
2. oxide or hydroxide of calcium, barium, strontium, or magnesium;
3. nitrates, halides, or carboxylic acid salts (except those of Group I metals or ammonium), e.g. calcium nitrate, magnesium chloride, barium bromide, nickel chloride, ferrous (or ferric) chloride, lead acetate, and calcium formate;
4. water-soluble sulphates, bisulphates sulphonates, or alums, e.g. aluminium sulphate, cupric sulphate, ferrous (or ferric) sulphate, potassium bisulphate and sodium sulphonate;
5. water-soluble alkaline salts of weak oxy acids and thio acids, e.g. sulphites, bisulphites, thiosulphates, sulphides and hydrosulphides;
6. salts of phosphorus acids, e.g. phosphonates, polyphosphates, hypophosphites and phosphites;
7. water-soluble inorganic salts (except ammonium salts) which can form calcium sulphate, bisulphate, carbonate, bicarbonate, halide, chromate, selenate, nitrate, permanganate, nitrite, chlorate, iodate or carboxylate in aqueous medium by cross-reaction (metathesis) with calcium hydroxide (or a water-soluble calcium salt) which is incorporated as a co-reactant in the reactivator part of the composition along with the water-soluble inorganic salt, e.g. barium nitrate or sodium formate;
8. powdered hydrated products of high alumina cement or calcium aluminate (ferrite) complex salts;
9. calcareous cements and pozzolans, e.g. Ordinary Portland cement, blast furnance cement and fly ash;
10. finely-divided silica, e.g. silica flour or pyrogenic silica.

The reactivator substance will generally be used in an amount of from 0.1 to 10% by weight, based on the high alumina cement, preferably 0.2 to 3% by weight. However in the case of insoluble reactivator substances such as those mentioned in 8, 9 and 10 above, which can also act as fillers, higher amounts may be employed.

In their employment the reactivator substances listed above are kept distinctly separate from the set-inhibited high alumina cement part until this is required to be set.

In a further embodiment of this invention certain non-reactive substances may also be employed which themselves are not capable of reactivating the set-inhibited high alumina cement but which enhance or promote the reactivity of the reactivator substance. Such substances thus function as auxiliary reactivators. Since these auxiliary reactivators are non-reactive with the high alumina cement, they may be incorporated in either the inhibited high alumina cement part or in the reactivator part, or in both parts. Examples of such auxiliary reactivators are:

lithium (and other Group I metal) salts (excluding the sulphate, bisulphate and sesquicarbonate and highly alkaline salts such as the hydroxide, carbonate, aluminate, zincate or silicate), e.g. lithium chloride; carbonates of calcium, strontium, barium, magnesium, copper, zinc, aluminium, iron, cobalt, nickel or lead; sparingly soluble calcium salts, in particular the sulphate (hydrate), chromate, selenate, permanganate, chlorate and iodate.

The reactivator composition may exist in solid form or as a solution or suspension in water or a non-aqueous liquid which acts as an inert medium, e.g. an organic hydrocarbon or ester.

The set-inhibited aqueous grouting composition and the reactivator composition may each contain, if required, additional constituents such as those conventionally used in cementitious compositions. These constituents include suspension agents, rheology modifiers, air entraining agents, bonding agents, foaming agents, expansion agents, fibrous reinforcements, fillers and pigments. Examples of such additional constituents are natural or modified polysaccharide gums, cellulose derivatives, synthetic polymers such as water dispersible epoxy resin systems, synthetic or natural rubber latices, modified wood rosins, lignosulphonates, salts of polyhydroxycarboxylic acids, salts of long chain fatty acids such as oleic and stearic acids, finely divided metal powders, inorganic mineral fillers, such as silica sand, fly ash, ground granite, mica, or coarse concreting aggregates, organic or inorganic fibres such as polypropylene or glass fibres, and organic or inorganic dyes and pigments.

The invention is illustrated by the following non-limitative Examples.

EXAMPLE 1

A set-inhibited aqueous grouting composition in the form of a paste (paste A) was formed by mixing together the following constituents:

|  | Parts by weight |
| --- | --- |
| High alumina cement (Ciment Fondu) | 100 |
| Water | 20 |
| Polysaccharide thickener and suspension agent (Polymer DP 433) | 1 |
| Synthetic rubber latex suspension agent (Dow 465) | 10 |
| Boric acid powder | 0.75 |

Polymer DP 433 is a powdered blend of polysaccharides commercially available from Hercules Limited, whilst Dow 465 is a high molecular weight styrene-butadiene emulsion marketed by Dow Chemical Co. Ltd.

A reactivator composition in the form of a paste (paste B) was formed by mixing together the following constituents:

| | Parts by weight |
|---|---|
| Lithium hydroxide monohydrate | 2.5 |
| Gypsum-agricultural grade (CaSO$_4$.2H$_2$O) | 100 |
| Water | 30 |

The reactivator paste B was then filled into a length of thin gauge polyester (namely polyethylene terephthalate) tubular film of 18 mm diameter and the resulting filled tube was then embedded within a length of tubular film formed from a polyethylene/polyester/polyethylene triple laminate, the tubular film having a diameter of 38 mm and containing paste A. The resulting length of filled substantially co-axial dual-compartment tubular film was formed into a plurality of sausage-shaped cartridges of 270 mm length having each end sealed by a clip.

These cartridges were stored at ambient temperature for 10 weeks without any sign of setting.

To test the capability of the cartridges produced in the foregoing manner to anchor a reinforcing member in competent strata, a 43 mm diameter borehole was drilled to a depth of 1.4 meters in a block of concrete, two of the cartridges were placed in the borehole, and a 36 mm diameter wooden (ramin) dowel was spun through the cartridges with the aid of a standard coal-mine boring drill (penetration time was 15 seconds). The dowel was left undisturbed for 5 hours, after which time a plug of fibre-glass filled polyester resin was cast on the end of the exposed part of the dowel in order to provide an anchorage to which pull-testing equipment could be secured. After a further hour a hydraulic jack was used in an attempt to pull the embedded dowel out of the block. At a pulling load of 10 tonnes the dowel broke with no apparent displacement of its embedded portion. The anchorage capability of the cartridges was thus deemed to be satisfactory.

EXAMPLE 2

A set-inhibited grouting composition in the form of a paste was formed by mixing together the following constituents:

| | Parts by weight |
|---|---|
| High alumina cement (Ciment Fondu) | 100 |
| Water | 17.5 |
| Polymer DP 433 | 0.5 |
| Dow 465 | 10 |
| Boric acid | 0.75 |

A reactivator composition in the form of a paste was formed by mixing together the following constituents:

| | Parts by weight |
|---|---|
| Lithium hydroxide monohydrate | 2 |
| Gypsum (agricultural grade) | 12 |
| Dibutyl phthalate | 7 |

Both pastes were simultaneously extruded into coaxial tubular polyester/polyethylene laminate film casings. The inner casing, of 16 mm diameter, contained the reactivator paste whilst the outer casing, of 38 mm diameter, contained the set-inhibited paste. The two pastes were extruded in a weight ratio of 18 parts set-inhibited cement paste to 1 part reactivator paste. The resulting length of filled co-axial dual-compartment tubular film was formed into a plurality of sausage-shaped cartridges of 270 mm length having each end sealed by a clip, each cartridge containing 610 g of the pastes.

These cartridges were stored at ambient temperature for 8 weeks without any significant setting of the set-inhibited paste being noted.

Three of the dual compartment cartridges were placed in a 43 mm diameter ×0.9 m deep borehole which had been drilled in a concrete block. A 25 mm deformed steel reinforcing bar (known as a rebar) with a 40 mm wide spade end was spun through the cartridges to the base of the borehole. After allowing the grouting composition to set for a period of 4 hours at 15° C., the rebar was load tested and broke at a pulling load of 24 tonnes without moving from its anchorage.

EXAMPLE 3

A pumpable grout suitable for the consolidation of porous strata, or for water-stoppage in such strata, was generated by passing two fluid components A and B through a grout injection gun which incorporated a static flow-mixing chamber. Grout composition A was made by dissolving 1½ parts by weight of boric acid powder in 52 parts of water and then stirring 200 parts of Ciment Fondu into the solution. Grout component B was made by mixing 8 parts by weight of "Pyramid H120" with 3½ parts by weight of "Pyramid 100 Alkaline". Pyramid H 120 is a commercially available sodium silicate solution having a 47% solids content and a SiO$_2$:Na$_2$O ratio of 1.6:1. Pyramid 100 Alkaline is a commercially available sodium silicate solution having a 42 % solids content and a SiO$_2$:Na$_2$O ratio of 2:1. Components A and B were delivered to the injection gun by two separate Mono (Trade Mark) pumps operating at speeds such that the ratio of A to B was approximately 4.4 to 1 by weight. The grout produced by the mixing of A and B was very fluid and this characteristic permitted the grout to be injected with extensive penetration into porous strata. The grout gelled within a short time (2–3 minutes) after being produced and thereby had the merits of not draining away unduly in the strata and of affording a rapid stoppage of ground water flow in water-logged strata. When grout component A was not being mixed with component B it was kept recirculating, either continuously or periodically at frequent intervals, through the pump and delivery hose by using a by-pass flow line from the injection gun to the pump. At the end of an injection cycle the injection gun was left filled with only A or B in order to prevent grout from setting within the gun. The grouting operation could be continued without any need to clean out the pumping or mixing equipment over a period of two days. Stability tests on A and B showed that the operation could have been continued over several weeks if desired.

EXAMPLE 4

A triple extrusion laminate plastics film 152 mm wide, consisting of equal thicknesses of polyethylene, polyester and polyethylene and having a total thickness of 75 μm was folded into a 38 mm diameter tubular cartridge having an internal flap, as described in British Patent Specification No. 1,463,950.

The major compartment within the cartridge was filled with a set-inhibited high alumina cement aqueous grouting composition in the form of a paste (paste A) formed from the following constituents:

| | Parts by weight |
|---|---|
| High alumina cement (Ciment Fondu) | 800 |
| Polymer DP 433 | 2.5 |
| Boric acid | 6 |
| Water | 140 |
| Guar Gum | 0.65 |
| Dow 465 | 80 |

The minor compartment, defined by the internal flap of the cartridge, was filled with a reactivator paste (paste B) formed from the following constituents:

| | Parts by weight |
|---|---|
| Lithium hydroxide monohydrate | 13 |
| Stearate-coated calcium carbonate (Omya BLR 3) | 105 |
| Chlorinated paraffin liquid (Cereclor 50 LV) | 32 |

Paste A and paste B were filled into the cartridge in a weight ratio of 20:1, using conventional paste extrusion equipment. Each end of the cartridge was closed with a metal clip. The overall length was 330 mm and the cartridge weighed 730 g.

Cartridges produced in the foregoing manner were tested for anchorage capability in the manner described in Example 1. The dowel was pull-tested three hours after insertion into the cartridges in the borehole. The dowel broke in tension at a pulling load of 12 tonnes, so indicating a satisfactory anchorage capability of this type of cartridge.

EXAMPLE 5

A set-inhibited high alumina cement paste formed from the following constituents:

| | % by weight |
|---|---|
| High alumina cement (Ciment Fondu) | 77.90 |
| Boric acid | 0.60 |
| Dow 465 | 7.80 |
| Guar gum | 0.05 |
| Water | 13.65 | was filled into a 32 mm diameter polyester/polyethylene laminate tubular film and the resulting filled tube was placed within a similar 38 mm diameter tubular film.

The annular space between the inner and outer tubular films was filled with a reactivator paste formed from:

| | % by weight |
|---|---|
| Superfine gypsum | 71.68 |
| Lithium hydroxide monohydrate | 1.80 |
| Water | 19.07 |
| Dow 465 | 7.16 |
| Polymer DP 433 | 0.29 |

The resulting dual-compartment tubular cartridge was closed at each end with a metal clip and had an overall length of 330 mm and a total weight 730 g. The cartridge was stored at ambient temperature for 12 weeks without any sign of setting. A cartridge produced in the foregoing manner was tested in the same manner as that described in EXAMPLE 4 and the same result was obtained.

EXAMPLE 6

A reactivator paste consisting of:

| | Parts by weight |
|---|---|
| Superfine gypsum | 60 |
| Calcium hydroxide powder | 4 |
| Water | 21.8 | was extruded into a length of 20 μm thick polyamide tubular casing of 21 mm diameter and around this casing was simultaneously extruded into a 70 μm thick polyester/polyethylene laminate tubular casing of 38 mm diameter a set-inhibited cementitious paste consisting of:

| | Parts by weight |
|---|---|
| Boric acid | 1.1 |
| Water | 26.3 |
| Guar gum | 0.1 |
| Dow 465 | 15 |
| High alumina cement (Ciment Fondu) | 150 |
| Lithium chloride | 1.0 |

The resulting filled length of dual casing was clipped off into 300 mm long dual-compartment sausage-shaped cartridges in a conventional manner. Three of these cartridges were placed in a 43 mm diameter, 1350 mm deep borehole drilled in concrete and a 36 mm diameter wooden (ramin) dowel was spun through them with the aid of a 500 r.p.m. rotary drill. After 4 hours, tensile loading was applied to the dowel, with the result that the dowel broke when the loading reached 10.5 tonnes, so indicating the suitability of cartridges of this type for anchoring wooden dowels in competent rock or coal strata.

The foregoing procedure was subsequently repeated with the only exception being that the lithium chloride auxiliary reactivator was omitted from the set-inhibited high alumina cement paste.

The result of loading the dowel after 4 hours was that the dowel was pulled out of the concrete block when the loading reached 3 tonnes. The much higher strength achieved with the composition containing lithium chloride reflects the improvement of the performance of the calcium hydroxide reactivator achieved by incorporation of this non-reactive auxiliary reactivator.

EXAMPLE 7

A 280 mm long tube of polystyrene having a 0.5 mm wall thickness and an 8 mm internal diameter was filled with calcium hydroxide powder and then completely sealed at each end with a plug of hot melt adhesive. The tube was then embedded in a paste of the following set-inhibited cementitious composition which nearly filled a 310 mm long piece of 70 μm thick tubular polyester/polyethylene laminate casing of 38 mm diameter which has been closed by a clip at one end:

| | Parts by weight |
|---|---|
| Boric acid | 1.1 |
| Water | 31.5 |
| Dow 465 | 10.5 |
| High alumina cement (Ciment Fondu) | 150 |
| Superfine gypsum | 32 |

|                  | Parts by weight |
| ---------------- | --------------- |
| Lithium chloride | 1.0             |

The open end of the casing was then closed by a clip so as to form a sausage-shaped rockbolting cartridge of 300 mm length. Five of these cartridges were placed in a 1.9 meters long, 43 mm diameter borehole drilled in a concrete block and a 25 mm diameter, 2.5 meters long steel rebar with a 35 mm splay-end was spun through them with the aid of a rotary compressed-air drill. After 4 hours the bolt was loaded in tension. At a loading of 22 tonnes the top of the bolt broke off, thus demonstrating an effective anchoring capacity for this type of rock bolting cartridge.

The above procedure was then repeated with the exception that the lithium chloride was omitted from the set-inhibited cementitious composition. On being loaded after 4 hours, the bolt started to be pulled out of the concrete block when the loading reached 8 tonnes. This anchorage performance was thus much inferior to that shown by the first cementitious composition which contained lithium chloride as an auxiliary reactivator substance to enchance the performance of the calcium hydroxide reactivator.

EXAMPLE 8

A 300 mm long dual-compartment rockbolting cartridge of 34 mm diameter was manufactured from a polyethylene/polyester/polyethylene triple laminate film. The ends of the cartridge were closed with metal wire clips.

The larger of the two compartments was filled with a set-inhibited cement paste of the following composition:

|                                | Parts by weight |
| ------------------------------ | --------------- |
| High alumina cement (Ciment Fondu) | 100         |
| Boric acid                     | 1.0             |
| Methyl hydroxyethylcellulose   | 0.2             |
| Styrene copolymer powder       | 3.0             |
| Water                          | 25              |

The smaller compartment was filled with an aqueous based reactivator of the following formulation:

|                              | Parts by weight |
| ---------------------------- | --------------- |
| Fine calcium carbonate powder | 5.0            |
| Lithium carbonate            | 2.0             |
| Hydrated lime                | 4.0             |
| Styrene copolymer powder     | 2.0             |
| Water                        | 5.0             |

The configuration of the cartridge was arranged such that the ratio of paste to reactivator was 6:1 by weight.

Cartridges made in the foregoing manner were stored for 3 months at 25° C. and then in a series of tests carried out in a concrete test block using 37 mm diameter ×375 mm deep boreholes which had been drilled with a 35 mm diameter rock drill. Prior to use each of the test boreholes was moistened to minimise the effect of suction into the concrete block, and a single cartridge was placed in each hole. A 24 mm diameter rebar bolt was then spun into each of the boreholes to simulate a short length anchor bolt. The results of the load tests at various times after insertion of the bolt were as follows:

30 minutes — 85 kN pull-out
5 hours — 130 kN pull-out
24 hours — 170 kN pull-out
72 hours — 210 kN pull-out

EXAMPLE 9

A cartridge similar in construction to that described in Example 7 was prepared using a set-inhibited cement paste of the following composition:

|                                    | Parts by weight |
| ---------------------------------- | --------------- |
| High alumina cement (Ciment Fondu) | 100             |
| Water                              | 25              |
| Gluconic acid delta lactone        | 2.5             |

In this Example the sealed polystyrene tube was filled with lithium hydroxide monohydrate crystals.

After storage for 42 days the cartridge was placed in a 43 mm diameter ×375 mm deep borehole which had been drilled in a concrete test block. A 32 mm diameter rebar bolt was spun into the cartridge thereby mixing the set-inhibited paste with the lithium hydroxide reactivator. When the bolt was load tested after 4 hours, a load of 120 kN was achieved before the bolt was pulled out of the block.

EXAMPLE 10

A set-inhibited pumpable cementitious composition was formed from the following constituents:

|                                    | % by weight |
| ---------------------------------- | ----------- |
| High alumina cement (Ciment Fondu) | 50.0        |
| Boric acid                         | 0.25        |
| Ethyl hydroxyethylcellulose        | 0.2         |
| Bentonite clay                     | 2.0         |
| Water                              | 47.55       |

The composition was a readily pumpable slurry stable for more than a month.

A storage stable reactivator slurry was formed from the following constituents:

|                              | % by weight |
| ---------------------------- | ----------- |
| Calcium carbonate (300 mesh) | 10.00       |
| Calcium carbonate (100 mesh) | 35.00       |
| Lithium carbonate            | 3.0         |
| Bentonite clay               | 2.0         |
| Water                        | 50.0        |

The two compositions were pumped through separate lines for a distance of 240 meters in an underground mine roadway. At the point of application the two compositions were blended in a ratio of 2 parts by volume of set-inhibited cement slurry to 1 part by volume of reactivator slurry by passing through a static mixer element. The blended composition was injected into pre-drilled holes in the rock face and set rapidly within 5 minutes to effectively seal the fissured rock against water percolation. After setting, the composition continued to gain strength thereby providing an additional reinforcement to the rock structure.

The use of set-inhibited compositions for this purpose enables pumps and transport pipework to remain filled with the composition for long periods. The need for frequent cleaning is thereby eliminated and the cementitious sealant/reinforcing composition is maintained ready for immediate use on demand.

What we claim is:

1. A method of producing a hardened high alumina cement grouting composition which comprises forming a set-inhibited aqueous high alumina cement grouting composition essentially comprising high alumina cement, water and a set-inhibiting agent selected from boric acid and gluconic acid delta lactone, and thereafter, when the grouting composition is required for use, incorporating in the set-inhibited aqueous high alumina cement grouting composition a reactivator composition comprising a reactivator which will cause the grouting composition to set rapidly to a high strength hardened cementitious composition.

2. A method according to claim 1, wherein the set-inhibiting agent is present in the set-inhibited composition in an amount of from 0.01 to 5 percent by weight, based on the weight of high alumina cement.

3. A method according to claim 1, wherein the reactivator composition contains lithium hydroxide, lithium carbonate, sodium silicate or calcium hydroxide.

4. A method according to claim 1, wherein the reactivator is employed in an amount of from 0.1 to 10% by weight, based on the weight of high alumina cement.

5. A method according to claim 1, wherein the set-inhibited composition and the reactivator composition are mixed together within a borehole drilled in a rock formation to provide a hardened cementitious grouting composition in the borehole.

6. A method according to claim 5, wherein the hardened grouting composition serves to anchor a reinforcing member which is inserted into the borehole.

7. A method according to claim 6, wherein the set-inhibited composition and the reactivator composition are provided as separate components contained in a dual-compartment frangible cartridge.

8. A method according to claim 1, wherein the set-inhibited composition and the reactivator composition are mixed together before being injected into a borehole drilled in a rock formation.

9. A dual-compartment frangible cartridge suitable for use in the anchoring of a reinforcing member in a borehole drilled in a rock formation, there being present in one compartment of the cartridge a set-inhibited aqueous high alumina cement grouting composition comprising high alumina cement, water and a set-inhibiting agent selected from boric acid and gluconic acid delta lactone, and in the other compartment a reactivator composition comprising a reactivator capable of causing the grouting composition to set rapidly to a high strength hardened cementitious composition when in use the reactivator composition is brought into contact with the set-inhibited composition.

* * * * *